Sept. 8, 1942.  G. ELLIS  2,294,897
METHOD OF DETERMINING STRAIN CONCENTRATION IN RIGID ARTICLES
Filed Nov. 7, 1938  3 Sheets-Sheet 1
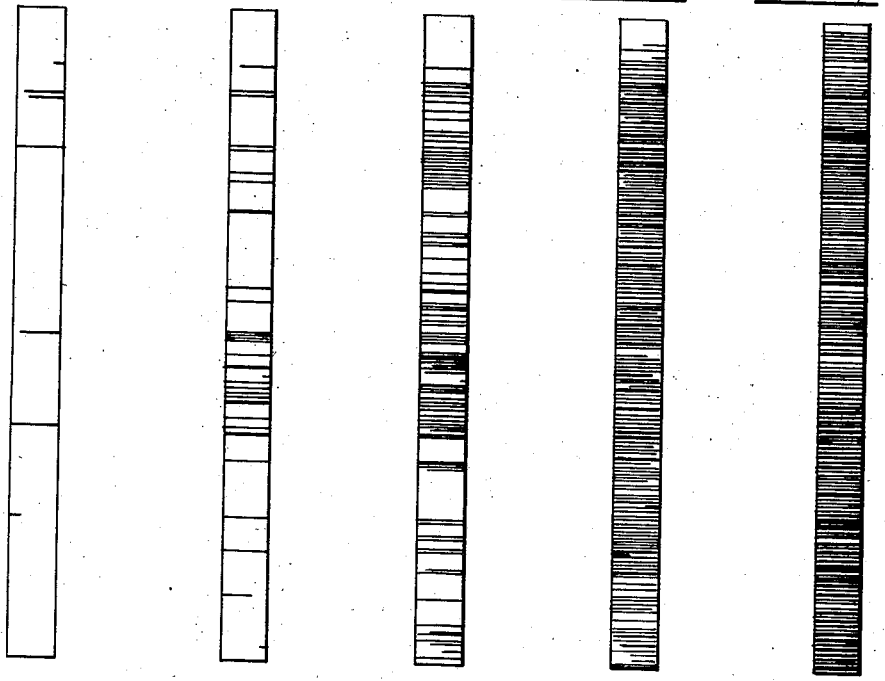
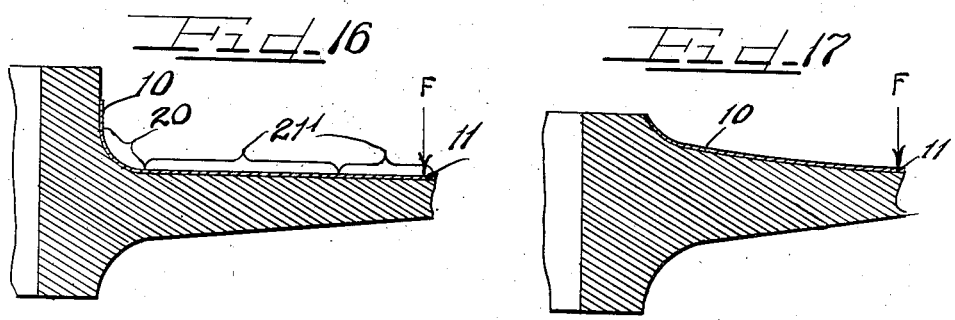
Inventor
Greer Ellis.
by Charles H. Hill Sept. 8, 1942.　　　　　G. ELLIS　　　　　2,294,897
METHOD OF DETERMINING STRAIN CONCENTRATION IN RIGID ARTICLES
Filed Nov. 7, 1938　　　3 Sheets-Sheet 2
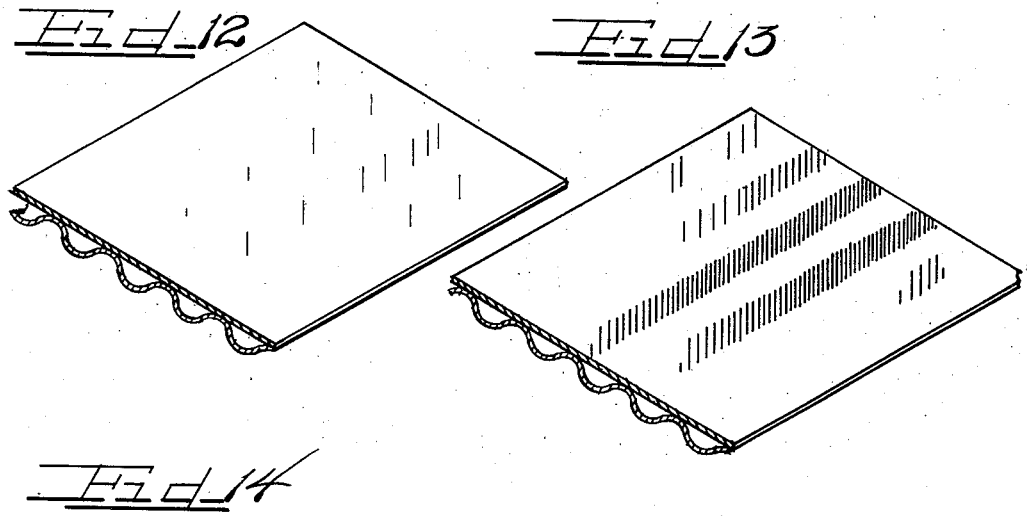
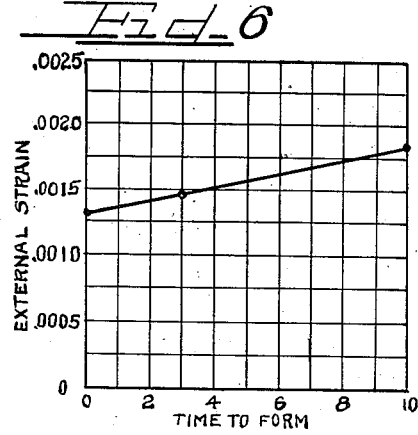
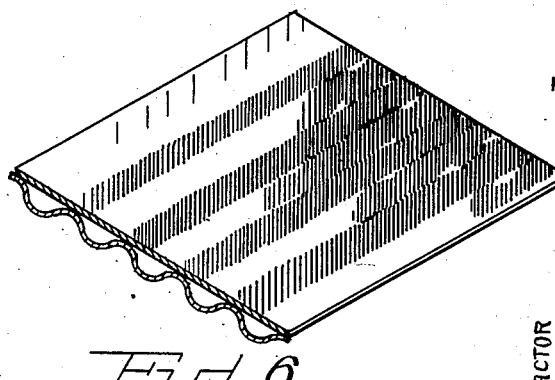
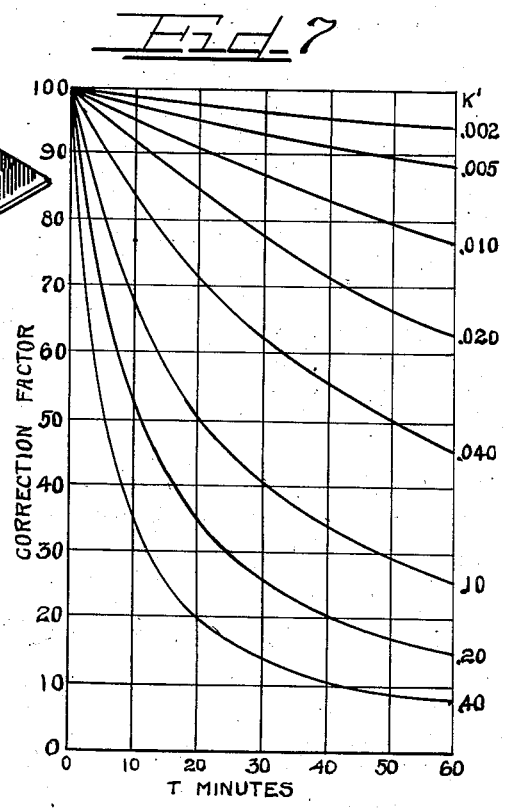
Inventor
Greer Ellis
by Charles W. Hills Attys.

Sept. 8, 1942.   G. ELLIS   2,294,897
METHOD OF DETERMINING STRAIN CONCENTRATION IN RIGID ARTICLES
Filed Nov. 7, 1938   3 Sheets-Sheet 3
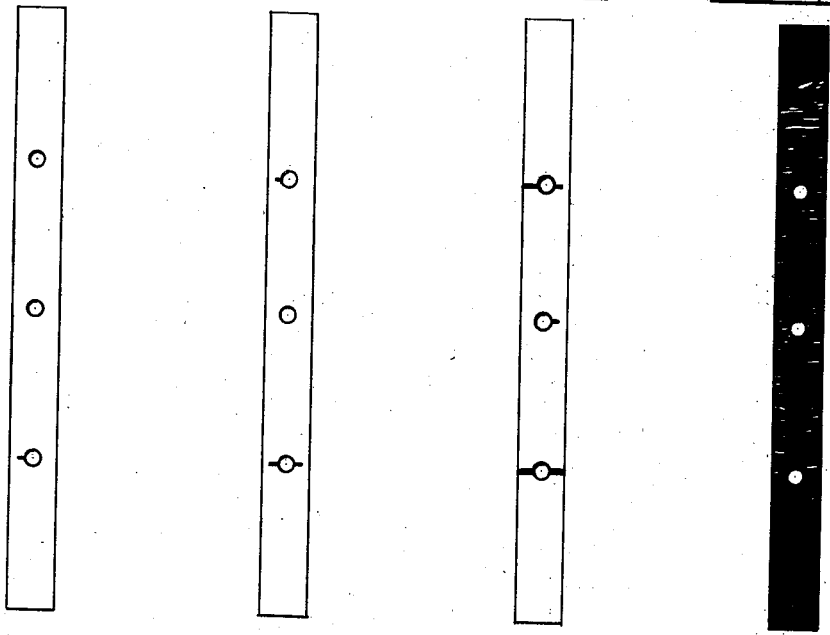
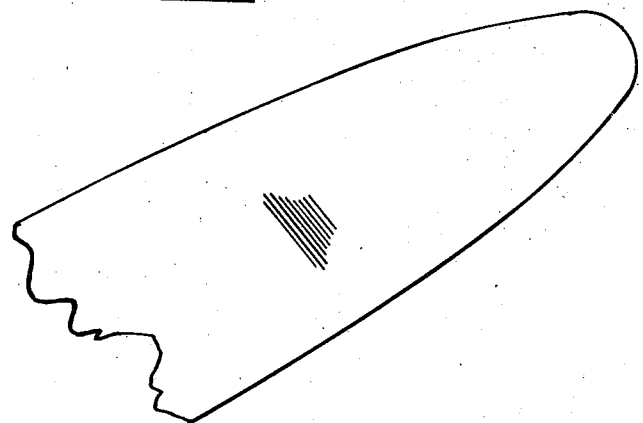
Inventor
Greer Ellis.

Patented Sept. 8, 1942

2,294,897

UNITED STATES PATENT OFFICE 2,294,897

METHOD OF DETERMINING STRAIN CONCENTRATION IN RIGID ARTICLES

Greer Ellis, Cambridge, Mass., assignor to Magnaflux Corporation, Chicago, Ill., a corporation of Delaware Application November 7, 1938, Serial No. 239,338

12 Claims. (Cl. 73—51)

This invention relates to a method of treating a rigid article to determine, first, the direction and relative concentration of superficial elastic strains in different parts of the rigid article effected by subjecting said article to various loads, and secondly, the absolute values of such strains. More particularly the present invention relates to a method of coating a rigid article of relatively high elastic limit with a continuous adherent brittle film which will rupture at strain values independent of variations in thickness of the brittle film and within a comparatively narrow range of strain values, so that when the coated article is subjected to increasing loads, the coating film will initially form a crack pattern over the most highly strained area, which pattern is gradually extended to areas of lower strain concentration as the load is increased, whereby the determination of the directions and concentration, as well as of the absolute values of superficial strains effected in various parts of the rigid article, is made possible.

It is known that grooves, ribs, fillets and other abrupt changes in area of cross section of machine parts cause a local concentration of the strains effected by the dynamic loads to which machine parts are subjected during actual operation. Such local maxima of strain concentration predispose to, and determine the course of, fatigue cracks or other failures due to dynamic operating loads. Data as to the relative concentration, direction and actual magnitude of strains in various parts of machine parts therefore are an indispensable basis for the intelligent designing of machine parts. Static tests of machine parts to destruction do not furnish these data, since they generally cause failure at points different from those proving weakest in dynamic operation. The reason for this is that on static testing to destruction plastic flow will relieve stress at points of local concentration, reducing likelihood of failure there, while under continuously varied interrupted or reversed loading without permanent deformation plastic flow will cause the initiation of failures at points of high strain concentration. Static tests also involve the disadvantage that the tested part is destroyed.

While it is possible to prepare models of machine parts in brittle materials such as plaster which will fracture instead of flowing plastically, it has been found that even with the most careful technique the results obtained are but rough approximations.

Complete information as to the direction, distribution and magnitude of strains effected by dynamic loads not exceeding the elastic limit may be obtained by several methods. One of these involves subjecting the part being tested to a static load not exceeding the elastc limit and measuring the strains effected in three directions at numerous points of the surface by means of strain gages. Another point by point method for determining local maxima of strain concentration measures the change in X-ray diffraction effected at various points in a metal article subjected to a static load not exceeding the elastic limit. A third and different method yields a general stress pattern at once by passing polarized light through a transparent model subjected to a static load not exceeding the elastic limit. Although all three of these methods make possible the determination of local maxima of strain concentration at dynamic loads below the elastic limit, they involve expensive apparatus and laborious, time-consuming experimentation by highly trained investigators. Hence their use is limited by economic considerations.

It has also been proposed to determine local maxima of strain concentration by a method comprising the initial step of treating an article to be investigated with lacquers or spirit varnishes consisting of solutions of resin in solvents, to cover the article with a brittle transparent adherent film which will crack at stresses therein produced by elastic strains in the article effected by static loads below the elastic limit of the material constituting the article. The direction of the cracks produced will everywhere be normal to the local maximum elongation in the article. Hence, in the second step of this process it is possible to determine quantitatively the maximum elongation produced at any given point in the article by a measurement in one direction only with a strain gage placed normal to the local cracks, the stressing being repeated.

The particular requirements of the coating films used in this prior art method are said to be: adherence, to prevent peeling when the coated article is subjected to elastic deformation; a lower elastic limit than the material of construction of the article being tested, to induce crack formation at elastic deformations of the article being tested; a considerably higher modulus of elasticity than the material of construction of the article being tested, to facilitate crack formation in the film when the article to be tested is subjected to elastic deformation.

Such coatings are also said to be capable of indicating directly the location of maxima of strain concentration. If a coated article is subjected to a gradually increasing load, the order of appearance of cracks at various points is said to indicate roughly maxima of strain concentration in order of decreasing degree of concentration. Only such maxima are indicated with any degree of accuracy, however, as are of very limited area and of very great strain concentration relative to surrounding areas, for all heretofore known coating compositions yield films which show continuous crack formation at all strain values above a certain minimum, and initial crack formation in prior art brittle film occurs within a wide range of strain values and depends furthermore on the local thickness of the film.

This method of determining local maxima of strain concentration contemplates the use of only static loads not exceeding the elastic limit of the material of construction of the article being tested. Such static loads are applied in the same direction as that in which the dynamic loads to which the article will be subjected on actual use will be active.

The visibility of the cracks formed in the transparent film depends on the reflection of light from the surfaces of the fracture and from the surface of the rigid material which it coats. Therefore this method is inapplicable to, first, articles having dull surfaces which will absorb the light rays so as to make the cracks invisible and, secondly, to articles presenting crystalline surfaces or other surface markings against the background of which the cracks would not be recognizable.

It is an object of the present invention to provide a method for determining the location, direction and magnitude of local maxima and minima of strain concentration in a rigid article of relatively high elastic limit directly, by coating said article with an adherent continuous brittle film and thereafter subjecting it to a suitable load.

Another object of the present invention is to provide a method of determining the strain concentrations in extended areas of a rigid article which do not effect a very large concentration of strain relative to adjacent areas.

Another object of the present invention is to provide a method of determining strain concentration by means of brittle films which method is applicable to articles having surfaces which are dull, crystalline or otherwise of such a nature as to make prior art measuring processes involving the use of brittle films inoperative.

Another object of the present invention is to provide a method of determining strain concentrations in which cracks in brittle films are made visible by other means than the reflection of light therefrom.

Another object of the present invention is to provide a method of determining strain concentration in rigid articles by means of brittle films in which the location of cracks is indicated on the surface of the rigid article, to render it unnecessary to make such cracks visible.

Another object of the present invention is to provide a method of determining strain concentration in rigid articles by means of opaque brittle films.

Another object of the present invention is to provide a method of determining strain concentration in rigid articles by means of films which rupture within such a range of strain values that the upper strain value at which a complete pattern of cracks is formed is not greater than twice the strain value at which the initial crack is formed.

Another object of the present invention is to provide a film forming composition comprising solvents which is suitable for the determination of strain concentration in rigid articles and which can be applied and dried at the same temperature as that at which the resulting film is to be tested, which preferably is room temperature.

Another object of the present invention is to provide a method of determining strain concentration in rigid articles by means of films which are caused to rupture by dynamic loads.

Other and further important objects of the present invention will become apparent from the appended description and claims.

When proceeding in accordance with my invention the article to be tested is coated with a continuous adherent brittle film.

Such an adherent brittle film should possess the following properties:

First, the film should crack at the same strain value regardless of variations in thickness. In practice it is impossible to produce films of uniform thickness over the whole area coated. If at areas of varying film thickness various strain values are required to effect cracking of the film, then, for example, on applying a uniformly increased static load on a not uniformly coated area actually having a uniform concentration of strains over its whole area, the most thinly coated areas would crack first and the more heavily coated areas would crack later, to give a misleading picture of the actual strain concentration.

Secondly, the film should crack within a narrow range of strain values. This property of the film can be tested by coating test strips so shaped as not to exhibit local areas of strain concentration, for instance, steel strips having a surface ¾"x12", and subjecting such strips to a steadily increased longitudinal tensional load. Initial cracking will occur, at a certain load, with irregular distribution of cracks over the whole area coated. As the load is increased, more cracks form, filling in the blank areas until at a load much larger than that at which the first crack formed a uniform pattern of cracks covers the entire surface. Increasing the load still further will not cause the formation of additional cracks until the strain at least doubles that at which the fully cracked pattern first formed. The term "full crack pattern" or "100% area cracked" as used hereinafter will signify the crack pattern formed when increasing the load further will not cause a significant number of additional cracks to form. Some experience is necessary to recognize this pattern. The distribution of cracks within a full crack pattern will vary in inverse ratio to the thickness of the film, as the cracks are situated, in a full crack pattern, at distances from each other approximately equal to five times the thickness of the film. The ratio of the strain value at full crack pattern to the strain value at initial cracking can be determined directly, for any film, by the method indicated. Obviously, the more closely this ratio approaches 1, the more accurate the results obtained using the film.

The gradual formation of cracks finally resulting in a full crack pattern is shown in Figures 1 to 5, which represent diagrammatically various stages during the tensional loading of a uniform, coated ¾"x12" bar subjected to an increasing longitudinal tensional load. Figure 1 shows the initial cracking, Figure 5 the full crack pattern, and Figures 2 to 4 intermediate stages.

Thirdly, as pointed out hereinbefore, the film should have a lower limit of elasticity than the rigid material which it coats, to permit cracking of the film at elastic deformations of the rigid material.

Fourthly, as also pointed out hereinbefore, the film should be adherent, to prevent peeling on elastic deformation of the rigid material.

Fifthly, the film should be continuous, as discontinuities will facilitate local crack formation which would give misleading patterns.

Sixthly, the film should have sufficient internal tensile stress to keep any cracks formed open after release of the strain which caused the cracks.

Seventhly, the film, if transparent, should have a relatively high index of refraction, to increase the visibility of the cracks, which is partly due to light reflected from the fracture surfaces.

Eighthly, the film should have a minimum of plasticity, to reduce plastic flow on prolonged static loading of the rigid article.

Ninthly, the film, after being deposited, should quickly assume permanently retained characteristics, to eliminate the necessity of conducting a test at a definite time after the formation of the film.

Tenthly, the film should form at ordinary temperatures and be capable of drying and testing at the same temperatures.

I have discovered that a film-forming composition comprising a brittle natural or synthetic resin, a plasticizer and a low-boiling, unitary, non-solvating solvent meets the above requirements to a surprising extent and is quite satisfactory, in the respects indicated, for the practical application of the present invention.

Such film-forming compositions can be applied by dipping, brushing or spraying. They are practicularly distinguished by the fact that the strain values at which their films crack is not a function of the thickness of the film.

Suitable films for use in connection with the present invention may also be produced by one of the following methods.

A resinous film may be produced by flowing on a molten resin such as lime-hardened rosin, or by melting or sintering a layer of a preferably powdered resin, which is then allowed to cool.

A vitreous film may be produced by flowing on a molten glass or glaze or by melting or sintering a layer of a preferably powdered glass or glaze, which is then allowed to cool.

Other films may be produced by flowing on melted sugar or other substances or by melting or sintering a layer of such a substance, preferably in a powdered form, which is then allowed to cool.

Suitable brittle oxide films may be formed by proper manipulation of the anodic coating process.

If desired, film forming compositions comprising a resin, a plasticizer and a solvent, can be pigmented, to yield pigmented films. Such pigmented films are of special interest where the surface of the article to be tested is either dull or else presents surface markings, since in the first case cracks in a transparent film would not be visible due to absorption of light transmitted through the film by the dull surface, while in the second case cracks in a transparent film would be difficult to recognize. The pigmented film is also operative over some painted or dirty surfaces. Such pigmented film forming compositions should contain slightly larger percentages of plasticizer than non-pigmented compositions to compensate for the pigment added.

Cracks in the pigmented film can be made more visible by staining with a suspension of a differently colored pigment in water or some other solvent not affecting the pigmented film. If necessary, the cracks may be enlarged prior to staining by etching with a suitable solvent, for instance, ligroin.

The location, direction and length of cracks in resinous films can also be indicated directly on the surface of a coated metallic article by enlarging the cracks by etching to expose the underlying metallic surface, for instance, with ligroin, and then etching the metal with a suitable substance such as an acid which will attack the metal without affecting the resinous film. When the latter is removed, the location, direction and length of the cracks once existing therein are then outlined on the metallic surface as etched areas thereon.

The present invention can also be made operative for objects having dull, scratched or marked surfaces or surfaces exhibiting discontinuities, by interposing a light reflecting film between the surface of the article and the transparent brittle film. All films which per se reflect light do not necessarily do so after being covered with a transparent film. Light is reflected from the interface between the two films only if there is sufficient difference in refractive index between the two films or if the lower film contains a light-reflecting pigment. Since most materials which could practically be considered as undercoats have indices of refraction not greatly different from resins, the most suitable method of formulating a light-reflecting undercoat involves pigmenting the latter with a light-reflecting pigment such as aluminum powder. Obviously the undercoat should not affect or be affected by the deposition of a brittle film thereon. For this reason, a solution of nitro-cellulose in ethyl acetate containing bright aluminum powder in suspension has been used. Ethyl acetate evaporates quickly and will consequently not be retained in the undercoat to affect the resinous film; and the non-polar, low-boiling compounds of carbon used in the composition forming the transparent brittle film do not affect the nitro-cellulose film.

The brittle films described are sensitive to changes in temperature. Testing temperatures below the temperature at which the film formed build up internal stresses in the film which cause the films to crack at smaller external strain values. If the temperature is allowed to fall too far below that prevailing during the formation of the film, spontaneous crazing of the film from the then excessive internal stresses will result. Obviously it is possible to make the brittle films operative for testing purposes at smaller loads by suitably lowering the testing temperature; this will, however, decrease the accuracy of the test by increasing the ratio of the strains effecting initial cracking and a full crack pattern. Conversely, raising the testing temperature will desensitize the brittle films to smaller loads while decreasing the ratio of strain values within which cracks are formed.

An approximate value of the internal stress caused by temperature changes in a brittle film deposited on steel can be computed from the coefficients of expansion of steel and of rosin which are, respectively, 0.000012 and 0.00012 per degree centigrade. Thus, in the case of a rosin film on steel, for each degree centigrade above or below the temperature of formation, a strain will develop of approximately 0.00011. This explains why brittle films will craze spontaneously if the temperature is suddenly lowered by, say, five degrees centigrade. Such spontaneous cracking takes the form of an irregular pattern of lines characteristically different from the regular pattern effected by external stressing.

The brittle films described require about 12 hours at 72° F. to form and to acquire stable sensitivity independent of thickness which will thereafter persist indefinitely. This drying is most suitably effected at the temperature at which the film forming composition was applied. If a thin coat of uniform thickness is applied, tests can be run after drying for only a half hour.

After an article to be investigated has been suitably cleaned, using gasoline or other volatile solvents, the film forming composition applied thereon and the film dried, the article is subjected to a suitable loading.

This may be effected by a tensile, bending, vibrational, torsional or impact loading which may be steady or interrupted but which should in any case start with a minimum not sufficient to effect cracking which should be increased, either gradually or by increments, to a maximum; the amount of load applied at any moment should be known. As the test progresses notes are made of the location, direction and proportional value of load whenever a full crack pattern appears in any locality. The test is interrupted when the whole film has been cracked. Since the known strain values at which a full crack pattern appears at the various areas are inversely proportional to the concentration of strains at the various localities, the relative values of strain concentration effected at the various localities may be computed from the data thus obtained. The cracks at any locality run normally to the maximum elongation at that point, consequently normally to the direction of the local strain.

The method just described yields relative values. For the determination of absolute values of local strain caused by a given external load the brittle film to be used must be calibrated by painting, drying and testing a strip of known strain concentration under the external conditions to be used for testing the article to be investigated; or a normal type strain gage can be applied to an area of the article being tested which is devoid of concentration spots when the strain at which the brittle film forms a full crack pattern between the gage points can be accurately determined. When the value of strain required to form a full crack pattern in a film is known, actual values of strains effected under various loads may be computed. Obviously a given film can be calibrated by quick tensile loading of a test strip in the manner indicated hereinbefore; and the value thus obtained can be applied to local crack patterns obtained in articles being subjected to torsional, shearing, vibrational or impact loads, which may be continuous or intermittent.

A particularly suitable method of loading is to apply the load rapidly and to again remove it rapidly, repeating this at regular intervals with a load constantly increased by a suitable constant increment.

The reason why prolonged continuous loading is undesirable is the fact that the brittle films will flow plastically under prolonged stress at a rate sufficient to require that a correction factor be applied in computations designed to yield the most accurate values. For this reason very rapid rates of loading, such as those obtained in vibratory straining, as well as impact loading, have been found particularly suitable. A method of correcting for plastic flow will be indicated hereinafter.

Figure 6 depicts graphically the influence of plastic flow effected by slow loading on the amount of strain necessary to effect a full crack pattern in a brittle film.

The correction factor C by which the total strain S at the time T of formation of full crack pattern should be multiplied to yield the strain value S' for formation of full crack pattern in zero time may be obtained by the following equation:

$$C = \frac{S'}{S}$$

So many variables enter into the problem of plastic flow that it is desirable to paint two or more uniform strips for tensional loading, in the manner described hereinbefore, at the same time the article to be investigated is painted, subject these strips to the same external conditions as the structure and test them at different rates of loading. If the general shape of the rate of loading curve is known, two test strips at different rates of loading should suffice to determine all correction factors. The general expression for plastic flow may be derived to good approximation as follows:

$k'$ = plastic flow constant
$k''$ = rate of external straining constant
$k'''$ = rate of total straining constant Assuming ideal fluid, plastic flow is:

$$ds = k'S'dt$$

Solution, for full crack pattern $$\int_0^{\bar{s}} ds = \int_0^T k'k''' + dt$$

$$\bar{s} = \tfrac{1}{2}k'k'''T^2$$

$$\bar{S'} = k'''T$$

$$\bar{s} = \tfrac{1}{2}k'\bar{S'}T$$

$$\bar{S} = \bar{S'} + \bar{s}$$

$$\bar{S} = \bar{S'}(1 + \tfrac{1}{2}k'T)$$

The correction factor C can be derived in terms of $k'$ and T:

$$C = \frac{\bar{S'}}{\bar{S}} = \frac{1}{1 + \tfrac{1}{2}k'T}$$

By means of this expression, curves of C against T have been plotted for the parameter $k'$ in Figure 7.

$k'$ can be evaluated from the two tests at different rates of loading, measuring $$\bar{S}_1, T_1, \text{ and } \bar{S}_2, T_2$$

$$\frac{\bar{S}_1}{\bar{S}_2} = \frac{\bar{S'}(1 + \tfrac{1}{2}k'T_1)}{\bar{S'}(1 - \tfrac{1}{2}k'T_2)}$$

$$k = \frac{2(\bar{S}_2 - \bar{S}_1)}{\bar{S}_1 T_2 - \bar{S}_2 T_1}$$

As pointed out hereinbefore, the need for applying the correction factor C can be avoided by rapid loading.

To illustrate a few of the possible methods of applying the principles of this invention to the practical determination of strain concentration in rigid articles the following examples are given. They are selected from the many methods which my disclosure will at once suggest to those skilled in the art.

*Example I*

A test strip ¾" wide and 12" long is used in which three holes having diameters of ⅛", 3/16" and ¼" are bored. These holes are equidistant from each other and from the ends of the strip. The surface of the strip is cleaned, washed with benzene and allowed to dry completely. A film forming composition, made up by dissolving 100 grams of 6% limed K wood rosin in 125 grams carbondisulfide, filtering and adding 5 grams of dibutyl phthalate, is applied with a thoroughly clean brush which is kept full. The formation of bubbles is avoided by not "brushing out." Two coats are applied; several minutes are allowed before the second coat is applied. The film is then allowed to dry for at least 12 hours. The application of the film forming composition, the drying and the subsequent testing is carried out at a reasonably uniform temperature, preferably in the range of 70° F. to 75° F.

The strip is then subjected to a continuous, continuously increasing always known tensional load. Figures 8 to 11 illustrate the progressive cracking of the film. Figure 8 shows how quick loading has produced the first crack beside the ¼" hole at a total load on the strip of 470 lbs. with a negligible elapsed time. Figure 9 shows initial cracking at a load of 640 lbs. beside the 3/16" hole after an elapsed time of 2 minutes. Correcting this load for the effects of plastic flow in the manner disclosed hereinbefore gives a corrected value of 520 lbs. Figure 10 shows the first cracking beside the ⅛" hole at 950 lbs., after 4 minutes elapsed time, which gives, after correction, a value of 680 lbs. Lastly, Figure 11 shows a full crack pattern in the open area of the strip formed at a total load of 3,000 lbs. after 10 minutes from the start of the test, which corresponds to a corrected value of 2,000 lbs. Relative strain concentration on the sides of the holes obtained by the ratios of loads as corrected for plastic flow give 4.2 for the ¼" hole, 3.8 for the 3/16" hole and 2.9 for the ⅛" hole, if the strain effected at the intervening area which does not effect concentration is taken as unity. Computations based on the theory of elasticity give theoretical stress concentrations of, respectively, 4.0, 3.6 and 3.2. Assuming the theoretical computation to be representative of actual conditions, the errors obtained by the present method are in the range of 10%.

The cracks in the brittle film are most easily seen in concentrated light reflected at an angle of about 45° from the surface of the film.

It is to be noted in this connection that the area of strain concentration around the holes is so limited that formation of first cracks and formation of full crack pattern are practically not distinguishable and are therefore equivalent.

On the basis of the data obtained the actual strain concentration around the various holes at other loads than those effecting full crack pattern can be computed. The final crack pattern is here effected at a strain of between 0.0006 and 0.0012, usually at a value of 0.001.

*Example II*

In this example the film forming composition comprises 40% by weight of 6% limed K wood rosin, 2% of normal butyl stearate and 58% methylene dichloride. This composition is painted on the outside surface of a flat stainless steel sheet shotwelded to a corrugated section of similar material. After the film is dried, the entire assembly is tested in a rig designed to produce pure shear in the assembly normally to the corrugated section. Figure 12 shows the first few scattered cracks produced over the shotwelds; these cracks form normally to the 45° maximum tensile component of strain at a load of 16,000 lbs. A load of 20,000 lbs. produces the first fully cracked patterns over several of the shotwelds, as shown in Figure 13. Not until a full load of 30,000 lbs. is used will the area between the shotwelds become fully cracked as shown in Figure 14. There is thus indicated a strain concentration of 150% over the shotwelds.

*Example III*

An aluminum alloy air plane propeller is coated with a composition comprising 5 grams wood rosin K treated with 15% calcium acetate, 8 grams carbon bisulfide, 0.6 gram dibutyl phthalate and 2 grams titanium dioxide. After the resulting opaque film has dried, the propeller is caused to vibrate in the second mode. Figure 15 shows how a fully cracked area at a section about one-quarter of the length in from the tip of the blade indicates a local maximum of strain concentration. These cracks are made visible by staining with a composition comprising 1 gram carbon black, 0.01 gram sodium lauryl sulfate and 10 grams water.

If the film forming composition is calibrated by testing with a known load under the same conditions of temperature, atmospheric humidity and the like, the absolute value of the strain concentration in the fully cracked area can be ascertained.

*Example IV*

In this example, marine propeller blades to be tested are coated with a composition producing a film capable of reflecting light when covered with a transparent brittle film. The undercoating composition comprises 1 gram 20 second nitrocellulose, 3 grams high leafing aluminum powder, and 30 grams ethyl acetate. Above the light-reflecting film there is applied a film-forming composition comprising 45% by weight of 6% limed wood rosin K, 2½% of dibutyl phthalate, and 52% carbon disulfide.

Figure 16 shows a longitudinal cross section through the center of the broad face of the blade of a marine propeller having a normal medium-sharp fillet; Figure 17 shows a similar section through the blade of a propeller having a broader theoretically constant stress fillet. In both figures the reference numeral 10 indicates the brittle coating, and the numeral 11 the computed center of pressure of the blades in service, where the loads were applied normally to the surface. The normal propeller formed a full crack pattern in the fillet over the area indicated by the reference numeral 20, at a load of 1000 lbs., and over the area of the blade indicated by the reference numeral 21, at a load of 1600 lbs. This indicates a strain concentration over the fillet, as compared to the blade, of 1.6. The constant stress propeller formed a full crack pattern at a load of 1600 lbs. simultaneously over the whole coated area, showing a uniform stress concentration thereover.

The disclosures made hereinbefore and the illustrative examples given show that I have invented a method of determining both the relative strain concentration effected in various areas of a rigid article and the absolute values of strains actually effected at these different areas. My invention is characterized by the fact that I cover the rigid article to be investigated with a brittle film which cracks at a strain value independent of variations of its thickness and which cracks within such a range of strain values that the upper limit does not exceed a value equal to twice the lower limit. By the term "lower limit" is understood the strain value at which the initial cracks appear; by the term "upper limit" is understood the strain value above which crack formation ceases, not to commence again until the strain value reaches twice the upper limit. My invention is further characterized by the continuous application of a continuously increased load, or by the intermittent application of increasingly greater loads; hence as the loading progresses, the brittle film will, in the initial stage, show no crack formation; there will thereafter occur an initial crack formation at the lower limit which is followed by the formation of additional cracks resulting in a full crack pattern which is effected as the upper limit is reached. If the loading is continued, no significant crack formation will occur until a strain about twice the value of the upper limit is reached when crack formation will occur until a yet higher upper limit is reached, when it will again diminish and cease. The crack formation in my process is therefore, in relation to a uniformly increased load, and independently of variations in thickness of the film, cyclic; and the cycles are definite and distinct. Obviously a necessary prerequisite for this cyclic crack formation is a film which forms cracks within a comparatively narrow range of strain values, as otherwise the cycles would approach each other, blend and become indistinguishable. Another condition precedent to the occurrence of cyclic cracking in films of uneven thickness is crack formation therein within the lower and upper limit independently of variations in thickness of the film, as without such independence the effect of such variations would cause crack formation at practically all strain values exceeding a certain minimum. This is exactly the case of prior art processes employing brittle films; these prior art films, produced by lacquers or spirit varnishes, shown uninterrupted formation of additional cracks subsequent to the formation of the initial crack, as the loading is increased. Hence the prior art films and processes are not capable of use for quantitative purposes, as there is no possibility of the formation of a full crack pattern.

In other words, I have disclosed a new type of brittle films, namely, those which even when not of uniform thickness are capable of intermittent or cyclic cracking under the influence of constantly or intermittently increased loads which may be applied continuously or intermittently. I have further invented a new method of determining relatively and absolutely the local maxima and minima of strain concentration which occur in rigid articles subjected to various loads. This new method employs the successive occurrence of the same stage in the cyclic cracking of a brittle film over various areas of a rigid article subjected to a constantly or intermittently increased always known load and the correlation of these successive occurrences with the then active load to determine the relative concentrations of strains effected by the load in the various areas. This invention also contemplates the calibration of a brittle film capable of cyclic crack formation by direct measurement of the actual strain prevailing during the occurrence of one of these stages of the cyclic crack formation and the use of the successive occurrence of the same stage of crack formation in the brittle film over various areas of a rigid article subjected to a constantly or intermittently increased always known load and the correlation of these occurrences and the loads effecting them with the data obtained during the calibration to determine the absolute values of strains effected in the various areas. Finally it contemplates the combination of the two methods outlined relating, respectively, to the determination of absolute and relative values, into one method in which calibration and relative measurement is accomplished during the same loading in the case of articles having surface areas not effecting a positive or negative concentration of strains, the measure of the strain or load necessary to cause a definite stage in the cyclic crack formation to occur at said surface area serving to calibrate the film during the imposition of the increased load with consequent successive occurrence of the same stage in the cyclic cracking of the film over various areas.

Obviously it is not necessary to cause the successive occurrence of the same stage of the cyclic crack formation over the whole surface of the article to be tested; valuable, although not complete, information may be obtained by causing the occurrence of said stage at only one or a few localities before the test is interrupted.

The present invention therefore offers a novel, convenient and highly advantageous method of determining elastic strain concentrations effected in rigid articles. I am aware that numerous details of this process may be varied without departing from the principles of this invention, and I, therefore, do not propose limiting the patent granted hereon otherwise than necessitated by the prior art.

I claim as my invention:

1. In a process for testing rigid articles by means of brittle adherent films, the step comprising coating said article with a pigmented film, stressing said article to crack the film and staining cracks formed in said pigmented film by a suspension of a pigment of a color different from said pigmented film in a liquid which will not affect said pigmented film.

2. In a process for testing rigid articles by means of brittle adherent films, the step comprising coating said article with a pigmented film, stressing said article to crack the film, enlarging any cracks formed in said pigmented film by etching and staining the thus enlarged cracks in said pigmented film by a suspension of a pigment of a color different from said pigmented film in a liquid which will not attack said pigmented film.

3. In a process for testing metallic articles by means of adherent brittle films, the step comprising enlarging any cracks in said brittle film by etching so as to expose the metallic surface and etching the thus exposed metallic surface with a substance which does not attack said brittle film, whereby after removal of said brittle film the location, direction and length of any cracks formed therein are indicated on said metallic surface by etched areas thereon.

4. In a process for testing rigid articles by means of transparent adherent brittle films, the step comprising initially coating said rigid article with a film capable of reflecting light when covered with a transparent brittle film and forming on said light-reflecting film a brittle continuous adherent transparent film.

5. The method of determining the relative distribution of elastic strains as between a plurality of superficial areas of a rigid article of relatively high elastic limit which comprises coating said article with a uniformly brittle film capable of crack formation under the influence of gradually increased loads, and subjecting said coated article to gradually increased known loads initially incapable of effecting crack formation in said film over the areas to be tested, until the successive occurrence of one and the same stage of the crack formation in said film over the areas to be tested has been effected, whereby the relative strain concentration in the areas of said rigid article being tested may be computed, being inversely proportional to the loads effecting said stage of crack formation in the brittle film coating said areas.

6. A process for determining the absolute value of elastic strain in a given area of a rigid article of relatively high elastic limit which comprises coating said rigid article with a uniformly brittle film capable of crack formation under the influence of gradually increased loads, subjecting said coated article to gradually increased predetermined loads initially incapable of effecting crack formation in said film over the area to be tested, until one stage of the crack formation in said film over the area to be tested has been effected, and determining the strain value at which said stage of crack formation occurs over an area thus coated which does not effect a concentration of strain, whereby the absolute value of said elastic strains may be computed.

7. A process for determining the relative distribution of elastic strains as between various superficial areas of a rigid article which comprises coating said article with a uniformly brittle film which will crack at elastic strains in said rigid article, the strain values effecting cracking of said film being independent of variations in thickness of said film and falling within a range in which the initial value of strain is approximately one-half of the final value, and subjecting said coated article to gradually increased predetermined loads initially incapable of effecting crack formation in said film over areas to be tested, until the successive occurrence of one and the same stage of crack formation in said film over said areas has been effected whereby the relative strain concentration in said areas of said rigid article may be computed from the relation between the loads effecting said stage of crack formation in said areas.

8. The method of determining the relative distribution of elastic strains as between various superficial areas of a rigid article which comprises coating said article with a uniformly brittle film which shows a maximum of crack formation followed by a minimum as the film is subjected to increasing stresses, subjecting said coated article to predetermined successively increased loads initially incapable of effecting crack formation in said film over areas to be tested, and continuing said loading until one and the same stage of crack formation has been effected over said areas.

9. The method of determining the relative distribution of elastic strains in a rigid article comprising coating said article with a uniformly brittle film which in response to increasing strains in said rigid article initially incapable of effecting crack formation in said film over the areas being tested will eventually crack at intervals in said film of five times the thickness of said film, subjecting said coated article to increasing predetermined loads which are initially incapble of effecting crack formation in said film over areas to be tested and continuing said loading until said film has cracked over said areas.

10. A process for determining quantitatively the distribution of superficial strains as between a plurality of areas on a rigid article which comprises coating said article with a uniformly brittle film capable of cracking when subjected to gradually increased strains to form patterns that typify the magnitude of the cracking strains, and straining said article under a series of increasing known loads initially incapable of effecting crack formation in the coating film over the areas to be tested, until a crack pattern typical of one and the same strain will have been effected in the film over the areas to be tested, whereby the relative strain concentration as between said areas may be computed, being inversely proportional to the loads effecting said typical crack pattern in the film over said areas.

11. A process for determining quantitatively the distribution of superficial strains as between a plurality of areas on a rigid article which comprises coating said article with a uniformly brittle film capable of reacting, in response to a series of gradually increased strains initially incapable of effecting cracking in the film over the areas to be tested, by the initiation of crack formation continued until a full crack pattern is formed typical of a definite strain value, said full crack pattern not being substantially modified by subjecting said film to strains increased gradually beyond said definite value, and subjecting said article to gradually increased known loads initially incapable of effecting the formation of a full crack pattern over the areas to be tested until a full crack pattern has formed over said areas, whereby the relative strain concentration as between said areas may be computed, being inversely proportional to the loads effecting the formation of said full crack pattern in the film over said areas.

12. In a process for testing rigid articles by means of transparent brittle films the steps comprising coating said rigid articles with a film capable of reflecting light when covered with a transparent brittle film, forming on said light reflecting film a uniformly brittle transparent film, loading the thus coated article with gradually increasing known loads initially incapable of effecting crack formation in the brittle transparent film until the same crack pattern occurs in the brittle film at different areas of the film whereby the relative strain concentration in the article at said areas may be computed as being inversely proportional to the loads effecting the said crack patterns.

GREER ELLIS.